A. W. KURZ.
MULTIPLE UNIT PUTTYLESS SKYLIGHT.
APPLICATION FILED JUNE 25, 1915.
1,259,528.
Patented Mar. 19, 1918.
3 SHEETS—SHEET 1.
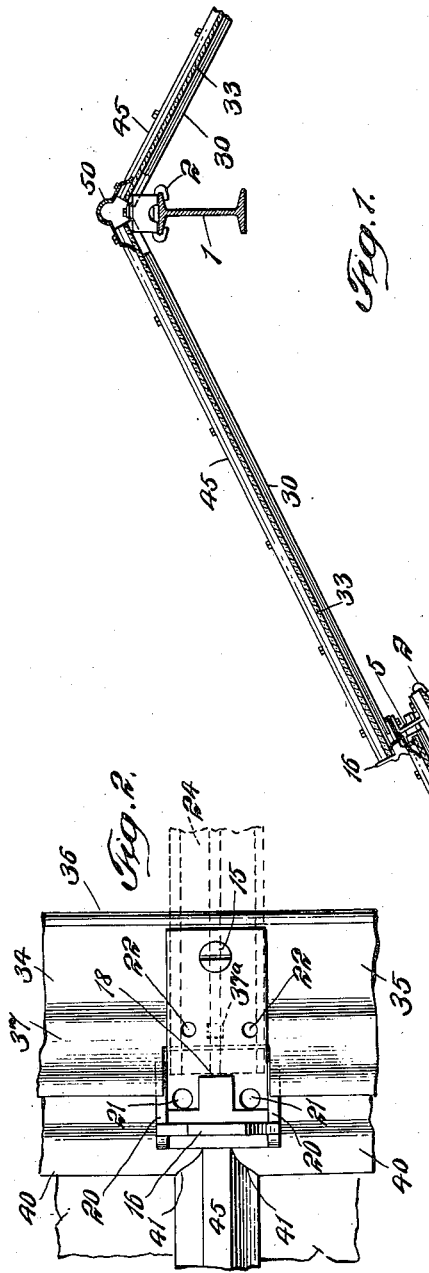
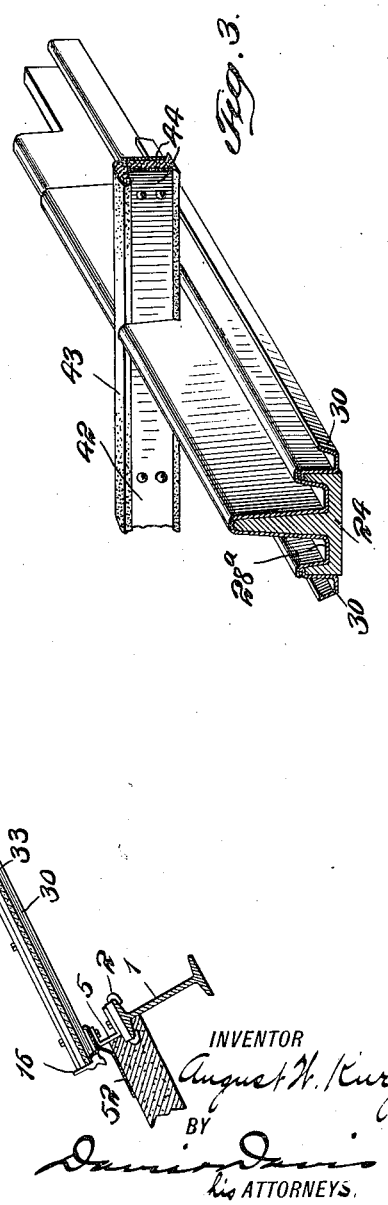
INVENTOR
August W. Kurz,
BY
his ATTORNEYS.

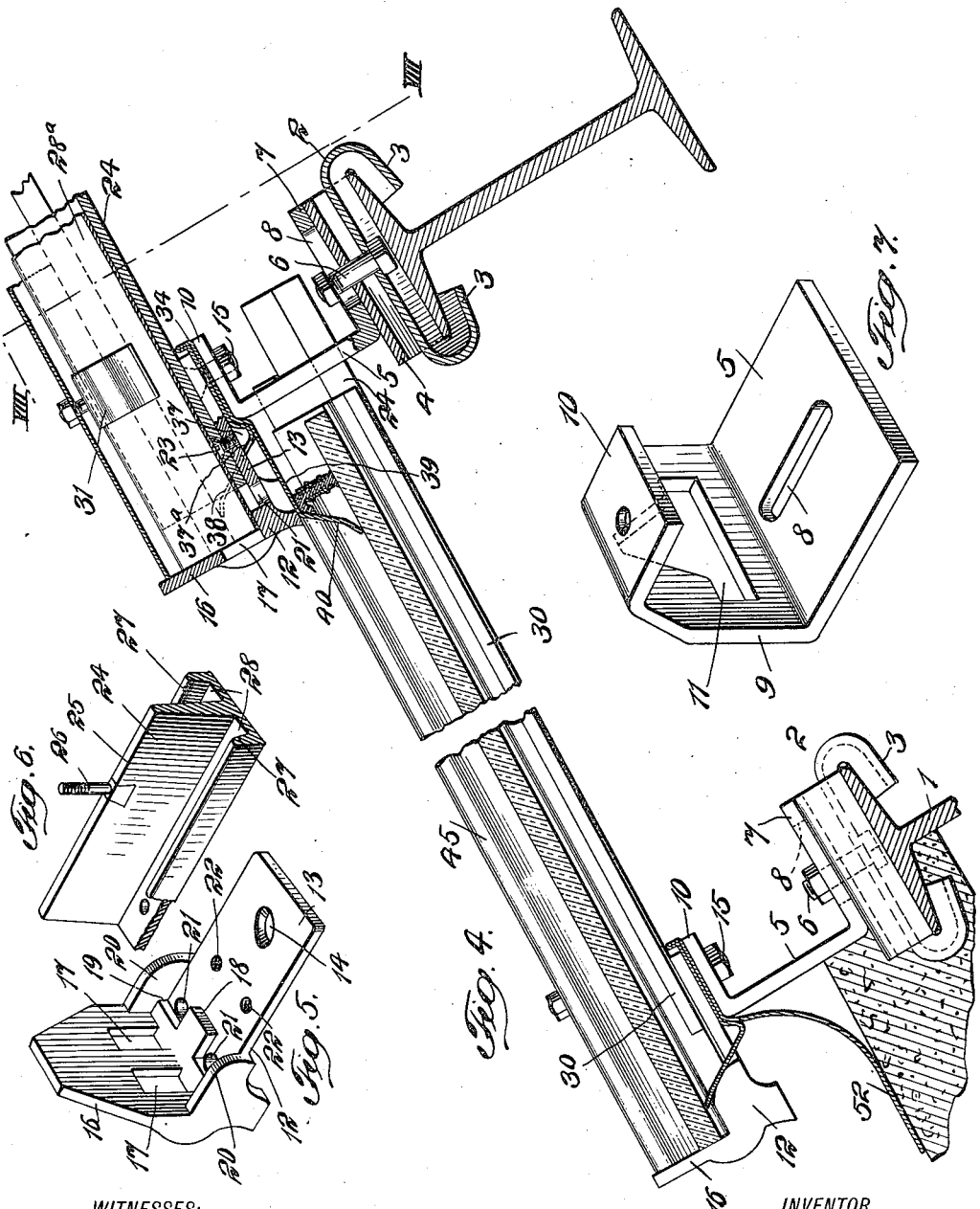

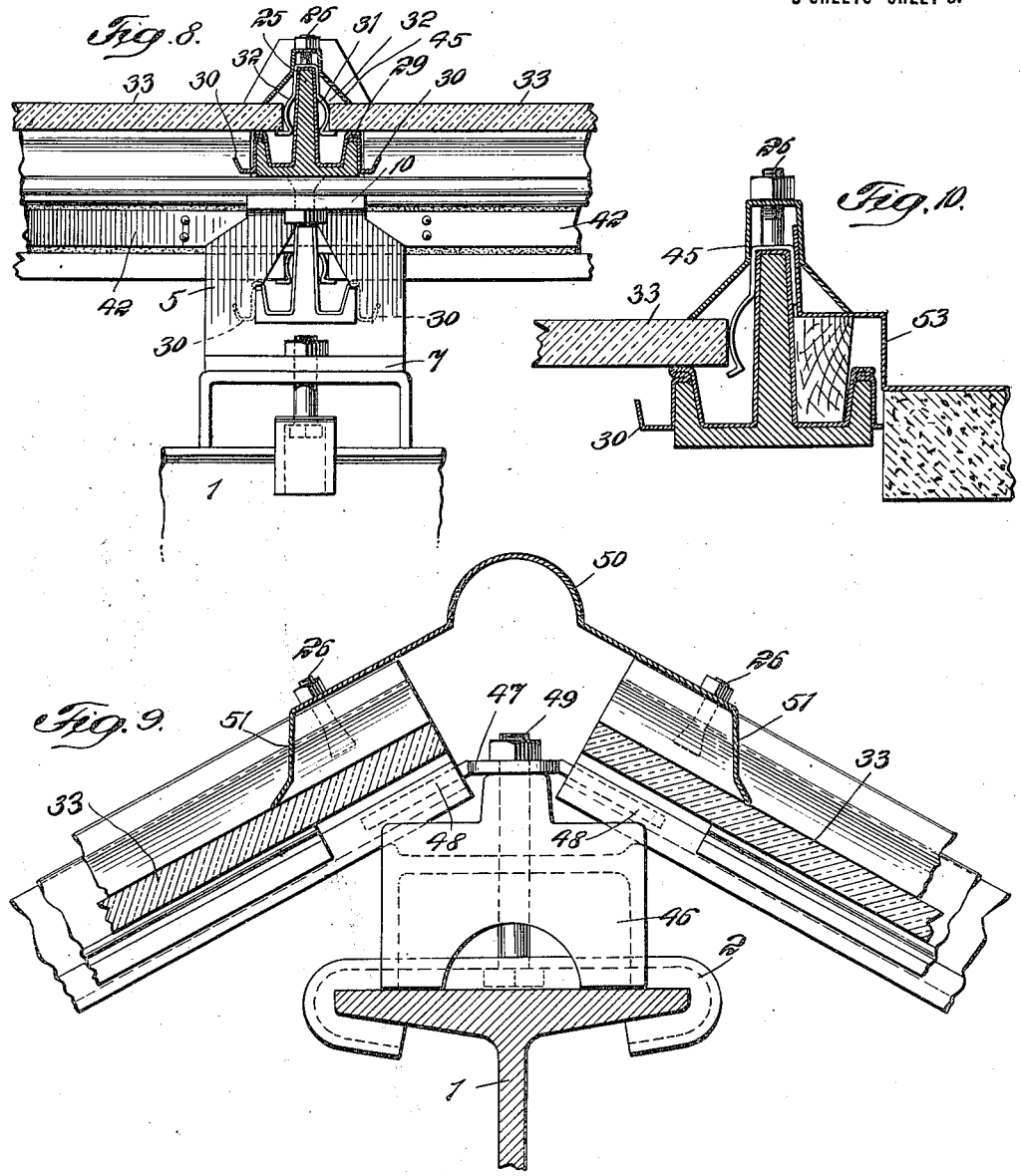

UNITED STATES PATENT OFFICE.

AUGUST W. KURZ, OF NOROTON, CONNECTICUT.

MULTIPLE-UNIT PUTTYLESS SKYLIGHT.

1,259,528.  Specification of Letters Patent.  Patented Mar. 19, 1918.

Application filed June 25, 1915. Serial No. 36,187.

*To all whom it may concern:*

Be it known that I, AUGUST W. KURZ, a citizen of the United States, residing in Noroton, county of Fairfield, and State of Connecticut, have invented certain new and useful Improvements in Multiple - Unit Puttyless Skylights, of which the following is a specification.

One of the main objects of this invention is to provide a skylight construction made up of multiple units each of which will be capable of independent expansion and contraction, and which will be constructed entirely of glass and metal, whereby the expansion and contraction of each unit will be localized and such expansion and contraction will not in any way impair the liquid-tight and dust-proof joints between the various units.

Another important object of the invention is to so construct the units that moisture from one unit will readily and quickly find its way to the next unit below, there being no pockets or depressions to retain any liquid.

Another important object of the invention is to completely protect the steel supporting bars or astragals from moisture so that the glass will not be streaked or discolored by rust from said bars.

Another important object of the invention is to provide a substantial but somewhat yielding or elastic support for each unit of the skylight, whereby the strains placed thereon will be taken up and distributed throughout the area of the skylight without danger of damage to any one unit.

Another object of the invention is to provide a dust seal at the upper edge of each unit.

There are other objects and advantages of the invention resulting from the construction of the parts and their relation in the assembled structure, all of which will be fully hereinafter described, and particularly pointed out in the claims.

In the drawing, Figure 1 is a vertical transverse sectional view of a portion of a skylight constructed in accordance with my invention;

Fig. 2 a detail plan view of a portion of a skylight showing one of the astragal brackets, the astragal or supporting bar being indicated in dotted lines;

Fig. 3 a detail perspective view of the upper end of one of the supporting bars showing the dust seal in position therein;

Fig. 4 an enlarged vertical sectional view of a portion of a skylight;

Fig. 5 a detail perspective view of one of the astragal brackets;

Fig. 6 a detail perspective view of the lower end of one of the astragals or supporting bars;

Fig. 7 a detail perspective view of one of the astragal bracket supporting saddles;

Fig. 8 a detail sectional view taken transversely of one of the supporting bars on the line VIII—VIII of Fig. 4;

Fig. 9 an enlarged transverse sectional view of the ridge portion of the skylight; and Fig. 10 a transverse sectional view of one end of the skylight.

Referring to the various parts by numerals, 1 designates the purlins which support the skylight structure and run longitudinally of the roof. The skylight is formed in sections or units, each unit bridging the space between two adjoining purlins and said purlins are arranged to give the skylight the proper pitch for drainage. The purlins are preferably of I-beams, but, of course, they may be of any shape in cross section. On each purlin is tightly fitted an anchoring yoke 2. These yokes are preferably formed of channel iron with their ends bent downwardly and inwardly to form the arms 3 which fit over the outer or top flanges of the I-beam purlins. Resting on each of the purlins, except the top or ridge purlin, is a base piece 4, said piece extending over the anchoring yoke. Mounted on each base piece 4 is a saddle 5, the yoke, base piece and saddle being rigidly clamped together by means of a bolt 6. This bolt also serves as a clamping means to secure the yoke to the purlin, as clearly shown in Fig. 4. The base 4 and the saddle 5 are formed of sheet steel properly bent or stamped to form. The saddle 5 is formed with the base flange 7 which is slotted at 8 for the passage of the bolt 6, said slot providing for a transverse adjustment of the saddle on the base piece. The saddle is also formed with the upstanding part 9 and the upwardly extending inclined portion or supporting flange 10 at its upper end. The upstanding part 9 is apertured at 11 to receive the upper end of the supporting bar or astragal mounted on the next purlin below, as will be hereinafter described. Rigidly secured to the upper supporting flange 10 of the saddle is an astragal bracket 12 said bracket being secured at its upper end to the flange 10 and inclining downwardly a suitable distance below said bracket, as clearly shown in Fig. 4. Each astragal bracket is formed with a base 13 apertured at 14 near its upper end for the passage of a bolt 15 which secures said bracket to the flange 10 of the saddle. At the lower end of the astragal bracket is formed an upwardly extending end plate 16, said plate being apertured at its lower end at 17 for the escape of liquid, as will be further hereinafter described. Near its lower end the bracket is formed with a shoulder 18 against which the lower end of the astragal bar bears. This shoulder is midway between the side edges of the bracket and is located a suitable distance from the end plate 16 so that it forms pockets 19 on each side thereof and between said shoulder extension and the side plates 20 of the bracket. The base plate of the astragal is formed with perforations 21 which are located in said pockets and permit the escape of moisture therefrom at a point considerably below the saddle on which the astragal bracket is mounted, as clearly shown in Figs. 4 and 5. The base plate of the bracket is provided with perforations 22 for the passage of screws 23 which secure the astragal bar 24 thereto.

Each astragal or supporting bar is formed with the central, vertical, longitudinally extending web 25 carrying the upstanding bolts 26, and the side flanges 27 which form the condensation gutters 28, one on each side of the central web 25. In all of the units or sections of the skylight the astragal bars extend from the astragal bracket supported by one purlin upwardly to the saddle carried by the next purlin above, as shown clearly in Figs. 1 and 4, the upper end of said astragal bar passing through the aperture 11 in the saddle and resting on the lower wall of said aperture. The astragal bar, therefore, is secured rigidly to a supporting means only at the lower end of said bar, the upper end thereof being free to slide through the upper saddle in expanding and contracting in response to variations in temperature, and also to permit of a slight yielding movement to respond to vibrations and stresses tending to strain or distort the skylight structure. Each astragal bar is sheathed throughout its length with a copper sheet bent to form the cushioning flanges 29 along the upper edges of the flanges 27, and the outside condensation gutters 30, as shown clearly in Figs. 8 and 10. This copper sheathing extends from a point near the upper end of the astragal bar to the lower end of said bar, the lower end of said sheathing resting against the plate 16 of the lower astragal bracket. The gutters 28ᵃ formed in said copper sheath and lying in the gutters 28 of the astragal bar extend to the opening 17 in the astragal plate 16 so that any liquid collecting in said gutters will be delivered through said openings. Any moisture accumulating below said copper sheath will be delivered through the openings 21, as before described. On each of the bolts 26 is arranged a yielding spacing clip 31 as clearly shown in Figs. 4 and 8, said clips straddling the web 25 and providing two bearings 32, one on each side thereof, for the glass sections or plates 33. These glass plates rest on the cushions 29 and extend from one astragal bar to the next adjacent bar, the said bars being arranged parallel and at a proper distance apart to accommodate plates of the desired width. The edges of these plates abut against the yieldable bearing portions of the spacing clips, said clips yielding in response to the expansion and contraction of the glass plates due to variations in temperature.

Secured to the supporting member 10 of each saddle is a flashing 34. This flashing extends longitudinally of the skylight, each of said flashing strips being connected to the saddles carried by each purlin, so that said strips run parallel with the purlins. The flashing strips are secured between the astragal bracket and the saddle and consist of a sheet of copper bent on itself to form the double thick portion 35 which is clamped between the astragal bracket and the saddle, the upper edge of said double thick portion being bent outwardly to form the flange 36 which extends upwardly and outwardly along the upper ends of the astragal brackets, said flange contacting with the lower surface of the astragal bars and forming a sealing flange to prevent moisture finding its way up and over the upper edge of the flashing. At the lower edge of the saddle the flashing is bent downwardly to form a gutter 37. From the lower edge of this gutter the upper thickness or sheet of the flashing is bent upwardly to form an upper member which acts as a sealing flange 38 which bears against the under side of the glass sheets, said sealing flange being cut out to permit it to extend up on both sides of the astragal bar. The lower sheet or thickness of the flashing is carried downwardly from the gutter 37 to form a lower member parallel with the upper surface of the sheet of glass next below; said parallel portion 39 extends to the lower end of the astragal bracket and to a point below the upper end of the said glass, and is then carried downwardly to bear on the upper surface of said sheet. This bent-down portion of the flashing forms a sealing flange 40; and said flange is cut out as at 41 to fit the astragal cap of the skylight section next below. This bent-down portion prevents any moisture passing up the glass sheet beyond said seal. Any moisture delivered through the openings 21 will be received by the portion 39 of the flashing and will flow from there downwardly to the skylight section below. The sealing flange 37 is apertured at 37ª under the astragal bracket to permit the escape of any moisture which may collect in the gutter 37, said moisture passing through said aperture to the portion 39 of the flashing, and thence to the next skylight section below. The outer gutters 30 of the astragal bar sheath terminate just above the gutter 37 so that any moisture accumulating therein will flow into said gutter 37 and thence through the aperture 37ª.

The web 25 of each astragal bar is notched near its upper end to receive the longitudinally extending dust seal 42. This seal consists of a felt strip 43 clamped between two metal strips 44; and it is continuous throughout the length of the skylight, running parallel with the purlins. The felt strip bears at its lower edge on the upper surface of the glass plates and at its upper edge on the under side of the portion 39 of the flashing. Said felt strip is preferably of sufficient width to be firmly clamped between the glass plates and the flashing, the edges of the felt being bent over or expanded by the pressure of these parts. This felt strip forms an effectual barrier and seal to prevent particles of dust passing up the glass sheets and under the flashing. Said seal also yields in response to the expansion and contraction of the glass plates and of the metal parts, due to variations in temperature. The copper sheathing for the astragal bars is also notched to receive the dust seal.

Each astragal bar is provided with an astragal cap 45 which fits over the web 25 and is secured in place by means of the bolts 26. This cap bears at its edges on the glass plates and effectually prevents the passage of moisture over the edges of said plates, the pressure of the nuts on the screws 26 forcing the edges of the cap into close contact with the glass. Said astragal caps extend from the plate 16 of the astragal brackets upwardly under the sealing flanges 40 of the flashing, the upper ends thereof bearing against the dust seal 42.

The upper ends of the astragal bars of the top sections or units of the skylight rest on ridge blocks 46 and are held in position by means of a clamp 47, said clamp being provided with arms 48 which extend into the gutters 28 of the astragal and retain said astragal bars in proper position, while at the same time permitting the necessary slight longitudinal movement thereof due to expansion and contraction, and strains. The ridge block 46 is secured in position by means of the usual anchoring yoke 2, the clamping bolt 49 extending through said yoke and said block, and the clamp 47. The upper edges of the top sections or units of the skylight are covered and protected by a ridge flashing 50 which extends longitudinally of the skylight and is formed with the downwardly extending sealing flanges 51 which rest on the upper surface of the glass. This ridge flashing is secured in position by means of the upper bolts 26 of the astragal bars.

At the lower edges of the skylight the flashing section 39 is bent outwardly to rest on the permanent non-glazed portion of the roof, as shown at 52 in Figs. 1 and 4.

In Fig. 10 is illustrated the manner of inserting the flashing 53 at the ends of the skylight, said flashing having one member extending up into the astragal cap and another member securely fastened to the permanent non-glazed end of the roof. It will, of course, be understood that the end flashing may be arranged in any suitable manner to fit conditions and to secure a moisture and dust-proof joint at the end of the skylight. This is also true of the disposition of the flashing at the lower edges of the skylight. This may be disposed in any manner to suit conditions and to form a moisture and dust-proof joint.

What I claim is:

1. A skylight comprising purlins, astragal brackets, means for supporting said brackets on said purlins, astragal bars secured at their lower ends to the astragal brackets their upper ends extending loosely through the astragal bracket supporting means on the adjoining purlins, the adjoining ends of the astragal bars overlapping, sheets of glass supported by said astragal bars, astragal caps covering the edges of the glass parallel with the astragal bars.

2. A skylight comprising purlins, astragal bars supported at their lower ends from the purlins, a flashing supported from the purlins independent of the astragals and sheets of glass and extending downwardly and bearing on the upper surfaces of the sheets of glass carried by the astragal bars, and a dust and moisture seal between said flashing and the sheets of glass and extending parallel with the purlins.

3. A skylight comprising purlins, astragal brackets supported thereby, bars supported by said brackets and formed with a central upstanding web and upstanding side flanges, the lower end of one bar overlapping the upper end of the adjoining bar, sheets of glass supported by said bars, said sheets overlapping to correspond with the overlapping of the bars, a flashing between the overlapping ends of the bars and having a member extending downwardly and bearing on the upper surfaces of the glass sheets supported by the lower bar, a dust seal extending through the vertical web of the lower astragal bar and bearing at its upper edge against the under side of the flashing and at its lower edge on the upper surface of the glass sheets supported by said bar, whereby said seal will extend through the bars and will be inclosed by the flashing.

4. A skylight comprising purlins, anchoring yokes connected thereto, saddles connected to said yokes, astragal brackets connected to the upper ends of said saddles, astragal bars rigidly secured at their lower ends to said brackets, their upper ends being supported by and extending loosely through the saddles on the adjoining purlins, sheets of glass supported by said bars, and a sealing means to prevent moisture and dust passing upwardly over the upper edges of the glass sheets.

5. A skylight comprising a series of astragal brackets, each consisting of a base and an end plate extending outwardly from the lower end of said base and side plates, an upstanding shoulder on said base near said end plate, an astragal bar secured to each of said brackets, the lower end of said bar fitting between the side plates and abutting against the upstanding shoulder, said shoulder preventing the said bar engaging the end plate, and glass plates carried by the astragal bars and engaging the end plate of the astragal bracket.

6. A skylight comprising a supporting means, a series of astragal brackets supported thereby each of said brackets consisting of a base and an end plate extending outwardly from the lower end of said base, an upstanding shoulder on said base near said end plate, side plates extending upwardly from the base where it adjoins the end plate, an astragal bar secured to each of said brackets the lower end of said bar fitting between the side plates and abutting against the upstanding shoulder, each of said bars being formed with a central upwardly extending web and outwardly extending side flanges forming gutters and glass supports, apertures being formed through said gutters at the lower ends of the bars and corresponding with apertures formed in the base of the bracket between the side plates thereof, and glass plates supported by the side flanges of the astragal bars.

7. An astragal bracket for a sklight construction comprising a base, an outwardly extending plate at the lower end thereof, and an upstanding shoulder formed on said base plate near the end plate thereof, said shoulder being adapted to prevent the astragal bar engaging the end plate, the end plate being perforated at its lower end where it adjoins the base plate.

8. An astragal bracket for a skylight construction comprising a base, an outwardly extending plate at the lower end thereof, said plate being perforated at its lower end where it adjoins the base plate, an upstanding shoulder formed on said base plate near the end plate thereof, said shoulder being adapted to prevent the astragal bar engaging the end plate, side flanges formed on said base plate where it adjoins the end plate, the base plate being perforated between said side flanges.

9. A skylight comprising astragal bars, means for supporting said bars one above the other with their adjoining ends in overlapped relation, sheets of glass supported by said bars, and a flashing supported between the overlapped ends of the said bars independent of the bars and the sheets of glass, said flashing being formed along its upper edge with an outwardly extending flange said flange extending in close proximity to the under side of the upper astragal bar and being formed with two members along its lower edge, one of said members extending upwardly and bearing against the under side of the sheets of glass carried by the upper astragal bar and the other extending downwardly and bearing against the upper surfaces of the sheets of glass carried by the lower astragal bar.

10. A skylight comprising astragal bars, means for supporting said bars one above the other with their adjoining ends in overlapped relation, sheets of glass supported by said bars, and a flashing supported between the overlapped ends of the said bars independent of the bars and the sheets of glass, said flashing being formed along its upper edge with an outwardly extending flange said flange extending in close proximity to the under side of the upper astragal bars and being formed with two members along its lower edge, said members being bent downwardly to form a transverse gutter, said members being separated at the lower edge of said gutter, one extending upwardly and bearing against the under sides of the sheets of glass carried by the upper astragal bar and the other extending downwardly and bearing on the upper surfaces of the sheets of glass carried by the lower astragal bar.

In testimony whereof I hereunto affix my signature.

AUGUST W. KURZ.